Patented Apr. 6, 1954

UNITED STATES PATENT OFFICE 2,674,561

2,674,561

PRODUCTION OF ORGANIC ACIDS

Andrew J. Moyer, Peoria, Ill., assignor to the United States of America as represented by the Secretary of Agriculture No Drawing. Application September 8, 1950, Serial No. 183,890

22 Claims. (Cl. 195—36)

(Granted under Title 35, U. S. Code (1952), sec. 266)

The invention herein described may be manufactured and used by or for the Government of the United States of America for governmental purposes throughout the world without the payment to me of any royalty thereon.

This invention relates to the production of certain organic acids by the action of molds. It has among its objects the provision of a process whereby the yield of valuable organic acids may be greatly increased.

This application is a continuation-in-part of application Serial No. 52,969, filed October 5, 1948, now abandoned.

In the past, organic acids, such as citric acid, itaconic acid, and ethylene oxide dicarboxylic acid have been produced by the fermentative action of molds cultivated in media containing fermentable carbon sources, assimilable nitrogen sources, together with the various known necessary inorganic nutrients and trace elements. The prior art production of these acids by mold fermentation results in disadvantageously low yields, considerably less than the theoretical based upon the carbon source metabolized by the molds. This disadvantage can be accounted for in part by the formation of other organic acids which not only reduce the yield of the desired acids but often impair the process of recovery and separation.

An object of this invention is to provide a process whereby the desired acids are produced in increased yields, and the production of undesired products is substantially inhibited. A further object is to provide a process whereby difficulties in the recovery of the desired acids, encountered by prior workers, are reduced or eliminated and whereby the acids can be produced more economically by the use of more impure nutrient sources.

The objects of this invention are accomplished by the use of methyl acetate or low molecular weight monohydric alkanols as adjuncts to the fermentation media. The effect of these alkanol adjuncts is to stimulate increased yield of the desired acids. The exact nature of the mechanism is not known. I have learned, however, that it is not dependent upon metabolism of the alkanols. This does not take place as a rule; in fact, in a few instances ethanol is metabolized to a slight extent and for this reason is not quite so effective as other alkanols; nevertheless, producing marked increases.

According to my invention, methyl acetate, methanol, ethanol, and the propanols are added to the fermentation media in amounts ranging from 1 to 5 percent by volume, preferably 1 to 3 percent. The fermentations are otherwise carried out in general in accordance with known methods. For example, the same general type of nutrient media is employed, containing the usual fermentable carbon sources, nutrients, etc., with the exceptions which will be described hereinafter. The same organisms are employed as are known in the art to produce the desired acids. The fermentations may be carried out either by surface or by submerged methods.

The effect of the adjuncts in producing superior yields of acid is not general for the whole class of acid-producing fermentations. Insofar as I have discovered it is not possible to predict the effects on the acid production, on the vegetative growth of the mold or on the stimulation or inhibition of undesired metabolic products. For example, neither methanol, ethanol or propanol will increase the yield of kojic acid to any material extent. The yield of gluconic acid is actually reduced by the alkanol adjuncts.

I have discovered during the course of my investigations that the relation between the vegetative growth of the organism and optimum acid production, according to my process, is contrary to what would normally be expected. In general, the effect of adjuncts is to decrease the mycelium growth when compared with a control fermentation. In a few isolated cases I have noted a slight temporary stimulation of mycelium growth, but this has always disappeared as the fermentation continued, the net result being a decrease. The physiological effect of the adjunct appears to be a toxicant, reducing both vegetation and tendency toward sporulation. If employed in amounts in excess of my ranges, the effect is to reduce materially both growth of the organism and acid production. However, within the ranges specified, even though attended by a small decrease in mycelium growth, the desired acids are produced in surprisingly increased yields, and the production of undesired metabolic byproducts materially reduced.

The advantages attending my invention are not limited to an increase in yield of the acids, but comprise other valuable features. For example, when employing my invention, the fermentation may be carried out successfully without the necessity for using pure nutrients or for elimination of trace elements, such as manganese in the case of citric acid. Furthermore, the fermentations are not so sensitive to pH conditions as in prior methods. According to my process the fermentations may be carried out within the initial pH ranges of 1.5 to 8.5. This latter feature is of particular value in using molasses as the carbon source in citric acid production, since it is difficult to lower the pH to the range of optimum condition as heretofore known.

Citric acid may be produced according to my invention employing any known citric acid-producing organism. Examples are *Aspergillus niger*, *A. wentii*, *A. schiemanni*, *Penicillium implicatum*, and the like. The carbon sources may be glucose, sucrose, molasses, such as beet molasses and blackstrap molasses, polyhydric alcohols, starch or modified starches, ground grain, and the like. In the case of itaconic acid the organism employed may be varieties of *Aspergillus terreus* with nutrients similar to those employed in the case of citric acid. Ethylene oxide dicarboxylic acid is produced by such organisms as *Aspergillus fumigatus*. The carbon source may be commercial glucose or other carbohydrate material known to produce this particular acid.

The following examples are illustrative of my invention.

EXAMPLE 1

This example illustrates the effect of methanol, ethanol, and isopropanol on the production of ethylene oxide dicarboxylic acid, recovered as the calcium salt.

Fifty ml. portions of a fermentation medium were prepared in a series of 200 ml. Erlenmeyer flasks. The medium consisted of the following ingredients made up for one liter:

| | Grams |
|---|---|
| Glucose monohydrate | 150.0 |
| Beet molasses | 20.0 |
| Corn steep liquor | 10.0 |
| $MgSO_4 \cdot 7H_2O$ | 0.25 |
| $(NH_4)_2SO_4$ | 0.70 |
| $KH_2PO_4$ | 0.30 |
| $ZnSO_4 \cdot 7H_2O$ | 0.044 |

To each culture was added 1.5 g. of $CaCO_3$. Just prior to inoculation adjuncts of the various alcohols were made to the sterile media. Inoculation was accomplished with dry, ungerminated spores of *Aspergillus fumigatus*. The flasks were incubated for 12 days at 30° C. The results are summarized in the following table.

Table I

| Alkanol adjuncts, by volume | Calcium salt of ethylene oxide dicarboxylic acid per culture |
|---|---|
| | Grams |
| None | 0.45 |
| 2% methanol | 0.74 |
| 4% methanol | 0.83 |
| 2% ethanol | 0.65 |
| 3% ethanol | 0.61 |
| 1% isopropanol | 0.74 |

EXAMPLE 2

This example illustrates the effect of methanol on the production of ethylene oxide dicarboxylic acid in a series of experiments employing various carbon sources. The fermentation organism was *Aspergillus fumigatus*.

Fifty ml. portions of a fermentation medium were prepared in a series of 200 ml. Erlenmeyer flasks. The medium consisted of the following ingredients made up for one liter:

Carbon source—as designated in Table II.

| | Grams |
|---|---|
| Beet molasses | 20.0 |
| Corn steep liquor | 15.0 |
| $MgSO_4 \cdot 7H_2O$ | 0.250 |
| $KH_2PO_4$ | 0.300 |
| $ZnSO_4 \cdot 7H_2O$ | 0.088 |
| $(NH_4)_2SO_4$ | 0.700 |

The flasks were inoculated with *Aspergillus fumigatus*. Immediately before inoculation the adjunct was added to half of the flasks. The flasks were incubated for 10 days at 30° C. The results are summarized in Table II.

Table II

| Fermentable carbon source used | Methanol added | Dry wt. of mycelium per culture | Dry wt. of calcium salt of ethylene oxide dicarboxylic acid per culture |
|---|---|---|---|
| | Volume Percent | Grams | Grams |
| Glucose monohydrate, 140.0 g. per l | 0 | 1.16 | 0.44 |
| | 3 | 1.16 | 1.12 |
| Sucrose, 135.0 g. per l | 0 | 1.18 | 0.39 |
| | 3 | 1.41 | 1.14 |
| Xylose, 130.0 g. per l | 0 | 0.58 | 0.12 |
| | 4 | 0.83 | 0.30 |
| Glycerine, 130.0 g. per l | 0 | 1.13 | 0.10 |
| | 3 | 1.47 | 0.39 |
| Sorbitol, 70%, 185.0 g. per l | 0 | 0.97 | 0.30 |
| | 3 | 1.38 | 0.89 |

EXAMPLE 3

This example illustrates the effect of ethyl alcohol on the production of itaconic acid by *Aspergillus terreus*. Fifty ml. portions of a fermentation medium were prepared in a series of 200 ml. Erlenmeyer flasks. The following base medium was employed:

| | |
|---|---|
| Glucose monohydrate | g— 110.0 |
| $KH_2PO_4$ | g— 0.100 |
| $MgSO_4 \cdot 7H_2O$ | g— 0.500 |
| $NH_4NO_3$ | g— 1.50 |
| $ZnSO_4 \cdot 7H_2O$ | g— 0.044 |
| Argo corn steep liquor | ml— 3.0 |

The fermentation media had an initial pH of 4.1. The flasks were inoculated with *Aspergillus terreus*. Immediately before inoculation, the adjuncts were added as designated in the table below. The flasks were incubated for 7 days. The results are summarized in Table III.

Table III

| Ethanol, volume percent | N/10 itaconic acid per culture | Dry weight of mycelium | Glucose consumed per culture | Yield of itaconic acid based on glucose consumed | Theory yield based on glucose consumed* |
|---|---|---|---|---|---|
| | Ml. | Grams | Grams | Weight Percent | Percent |
| 0 | 2 | 1.42 | 4.8 | 0.2 | 2.8 |
| 2 | 194 | 1.05 | 4.95 | 25.4 | 35.2 |
| 3 | 319 | 0.78 | 4.8 | 43.2 | 59.7 |
| 4 | 305 | 0.64 | 4.3 | 46.1 | 64.1 |

*1 mole glucose ⟶ 1 mole itaconic acid.

EXAMPLE 4

This example illustrates the effect of methanol and isopropanol on the production of itaconic acid. Fifty ml. portions of the fermentation medium were prepared as in the above examples. The medium consisted of the following ingredients made up for one liter:

| | |
|---|---|
| Sucrose | g— 121.0 |
| $MgSO_4 \cdot 7H_2O$ | g— 0.250 |
| $KH_2PO_4$ | g— 0.100 |
| $NH_4NO_3$ | g— 1.00 |
| $Mg(NO_3)_2 \cdot 4H_2O$ | g— 1.00 |
| $ZnSO_4 \cdot 7H_2O$ | g— 0.044 |
| Corn steep liquor | ml— 2.0 |

The initial pH of the medium was 4.0. The flasks were inoculated with ungerminated spores of *Aspergillus terreus*. Immediately before inoculation, the adjuncts were added as designated in the table below. The flasks were incubated for 9 days. The results are summarized in Table IV.

Table IV

| Adjunct, by volume | N/10 itaconic acid per culture | Dry weight of mycelium |
|---|---|---|
| | Ml. | Grams |
| None | 8 | 1.25 |
| 2% methanol | 340 | 0.77 |
| 3% methanol | 204 | 0.64 |
| 1.5% isopropanol | 264 | 0.90 |

EXAMPLE 5

This example illustrates the effect of methanol on the production of itaconic acid in submerged cultures. One hundred ml. portions of the fermentation medium were prepared in 300 ml. flasks. The medium consisted of the following ingredients made up for one liter:

Glucose monohydrate _____g__ 165.0
$KH_2PO_4$ _____g__ 0.100
$MgSO_4 \cdot 7H_2O$ _____g__ 0.500
$NH_4NO_3$ _____g__ 1.50
$ZnSO_4 \cdot 7H_2O$ _____g__ 0.044
Argo corn steep liquor_____ml__ 3.0

The initial pH of the medium was 4.1. The flasks were inoculated with ungerminated spores of *Aspergillus terreus*. Immediately before inoculation, the adjunct was added to one-half of the cultures. A submerged fermentation was carried out for a period of 9 days. The results are summarized in Table V.

Table V

| Methanol, volume percent | N/10 itaconic acid per culture | Dry weight of mycelium |
|---|---|---|
| | Ml. | Grams |
| 0 | 138 | 2.30 |
| 2 | 242 | 2.15 |

EXAMPLE 6

This example illustrates the effect of methanol as an adjunct in the production of citric acid from sucrose by various Aspergilli in surface cultures. Fifty ml. portions of the fermentation medium were prepared as in Examples 1 to 4. The medium consisted of the following ingredients made up for one liter:

Sucrose _____g__ 164.0
$MgSO_4 \cdot 7H_2O$ _____g__ 0.50
$KH_2PO_4$ _____g__ 0.15
$NH_4NO_3$ _____g__ 1.50
$ZnSO_4 \cdot 7H_2O$ _____g__ 0.044
Corn steep liquor_____ml__ 6.0

The initial pH of the medium was 4.2. The flasks were inoculated with various Aspergilli immediately after addition of the adjunct to one-half of the cultures, and were incubated at 30° C. for 8 days. The results are summarized in Table VI.

Table VI

| Mold used | Methanol | N/10 citric acid per culture | Yield of citric acid based on sucrose consumed |
|---|---|---|---|
| | Volume percent | Ml. | Weight percent |
| A. niger | 0 | 184 | 19.3 |
| | 3 | 696 | 58.9 |
| A. wentii | 0 | 204 | 15.9 |
| | 3 | 574 | 44.8 |
| A. schiemanni | 0 | 232 | 18.1 |
| | 3 | 616 | 48.1 |

EXAMPLE 7

Finely ground corn (140 g.) was employed in a medium comprising nutrient salts and 5.0 grams of $CaCO_3$. One hundred ml. portions were employed in 300 ml. Erlenmeyer flasks. After steam sterilization the flasks were inoculated with 3 ml. of a suspension of germinated spores. To half of the cultures was added 4 percent methanol as the adjunct. The flasks were incubated for 9 days on a Ross-Kirshaw shaker. The results are summarized in Table VII.

Table VII

| Methanol, volume percent | N/10 citric acid per culture | Oxalic acid present | Gluconic acid present |
|---|---|---|---|
| | Ml. | | |
| 0 | 181 | None | Trace. |
| 4 | 628 | None | None. |

EXAMPLE 8

Eleven gram portions of dry corn starch were placed in a series of 300 ml. Erlenmeyer flasks. To each flask was added 90 ml. of a nutrient medium containing the following ingredients:

$MgSO_4 \cdot 7H_2O$ _____g__ 0.03
KCl _____g__ 0.03
$NH_4NO_3$ _____g__ 0.075
$H_3PO_4$ (0.5 N) _____ml__ 3.0
$H_2SO_4$ (0.5 N) _____ml__ 2.0
Corn steep liquor_____ml__ 0.7
$ZnSO_4 \cdot 7H_2O$ _____g__ 0.004
Glucose monohydrate_____g__ 0.1

The flasks were heated in a water bath with stirring until the starch had gelatinized. The flasks were then sterilized in an autoclave at 20 pounds steam pressure for 30 minutes. After sterilization the medium had an initial pH of 3.0 and contained 0.21 percent glucose. To determine the potential glucose of the media, a sample was given a strong acid hydrolysis whereupon it analyzed 10.84 percent glucose. Each flask was seeded at room temperature with a small portion of a germinated spore inoculant of *Aspergillus niger*. Sufficient sterile water was added to make a volume of 100 ml. per culture for half the cultures. To the remaining half of the cultures was added 3 volume percent methanol based on 100 ml. volumes. These cultures were then made up to 100 ml. with sterile water.

The flasks were incubated for 8 days at 30° C. on a Ross-Kirshaw shaker. The results are tabulated in Table VIII.

Table VIII

| A. niger strain | Methanol | N/10 citric acid per culture | Glucose remaining per culture | |
|---|---|---|---|---|
| | | | Before hydrolysis | After a strong acid hydrolysis |
| | Volume Percent | Ml. | Grams | Grams |
| NRRL 330 | 0 | 36 | 3.60 | 3.60 |
| | 3 | 308 | 3.03 | 3.11 |
| NRRL 337 | 0 | 58 | 4.07 | 4.35 |
| | 3 | 408 | 2.61 | 2.83 |
| NRRL 604 | 0 | 41 | 3.36 | 3.36 |
| | 3 | 491 | 2.36 | 2.61 |

EXAMPLE 9

Sufficient hydrochloric acid was added to 200 g. of beet molasses to give a pH of 7.2. The molasses had been treated with potassium ferrocyanide to remove such trace elements as iron and manganese and had an initial sucrose content of 54 percent. The acidified molasses was made up to one liter with water, and 50 ml. portions were placed in 200 ml. Erlenmeyer flasks and steam sterilized. When cool, varying amounts of methanol were added as adjuncts. After which, the flasks were inoculated with ungerminated spores of *Aspergillus niger*. The flasks were incubated for 8 days at 30° C. The results are summarized in Table IX.

*Table IX*

| Methanol, volume percent | N/10 citric acid per culture | Dry weight of mycelium per culture |
|---|---|---|
| | Ml. | Grams |
| 0.0 | 212 | 1.12 |
| 1.0 | 310 | 1.34 |
| 2.0 | 408 | 1.28 |
| 3.0 | 506 | 0.97 |

EXAMPLE 10

The following base medium was employed, the basis being one liter:

| | | |
|---|---|---|
| Glucose | g | 126.0 |
| NH$_4$NO$_3$ | g | 1.75 |
| K$_2$SO$_4$ | g | 0.232 |
| NH$_4$H$_2$PO$_4$ | g | 0.400 |
| ZnSO$_4$·7H$_2$O | g | 0.044 |
| Ferric tartrate | g | 0.005 |
| Corn steep liquor | ml | 0.5 |

Fifty ml. portions of this medium were placed in 200 ml. Erlenmeyer flasks. The adjuncts, as designated in Table X, were added to the base medium just before inoculation with ungerminated spores of *Aspergillus niger*. All cultures were incubated at 30° C. for 6 days. The results are summarized in Table X.

*Table X*

| Adjuncts to the base medium, by volume | N/10 citric acid per culture | Dry weight of mycelium per culture | Yield of anhydrous citric acid based on glucose consumed |
|---|---|---|---|
| | Ml. | Grams | Weight percent |
| None | 54 | 1.25 | 7.4 |
| Isopropanol: | | | |
| 1% | 62 | 1.23 | 8.2 |
| 2% | 118 | 0.99 | 20.0 |
| 3% | 10 | 0.48 | |
| Methyl acetate: | | | |
| 1% | 64 | 1.12 | 8.3 |
| 2% | 132 | 1.14 | 15.4 |
| 3% | 182 | 1.02 | 23.7 |
| Methanol: | | | |
| 1% | 106 | 1.17 | 11.5 |
| 2% | 374 | 0.99 | 40.0 |
| 3% | 630 | 0.84 | 66.1 |
| Ethanol: | | | |
| 1% | 90 | 1.20 | 9.6 |
| 2% | 250 | 1.16 | 31.1 |
| 3% | 333 | 1.03 | 52.9 |
| N-propanol: | | | |
| 0.5% | 97 | 1.24 | 10.0 |
| 1.0% | 284 | 0.97 | 45.0 |
| 2.0% | 206 | 0.83 | 41.0 |

EXAMPLE 11

Two media consisting of the following ingredients were prepared:

| | Grams |
|---|---|
| Glucose | 11.34 |
| MgCl$_2$·6H$_2$O | 0.020 |
| NaH$_2$PO$_4$ | 0.020 |
| KCl | 0.010 |
| MgSO$_4$·7H$_2$O | 0.005 |
| ZnSO$_4$·7TH$_2$O | 0.004 |
| Ferric tartrate | 0.001 |
| MnSO$_4$·4H$_2$O | 0.005 |
| Corn steep liquor | 0.020 |
| NaNO$_3$ | 0.162 |
| NH$_4$Cl | 0.013 |
| Distilled water to make 100 ml. | |

To one medium was added 3 ml. of methanol. Both media were then inoculated with 2 ml. of a germinated spore suspension of *Aspergillus niger*. The media were fermented on a Ross-Kirshaw shaker at 30° C. for 10 days. The results are summarized in Table XI.

*Table XI*

| Methanol, volume percent | N/10 citric acid per culture | Anhydrous citric acid per culture | Glucose consumed per culture | Yield of anhydrous citric acid based on | |
|---|---|---|---|---|---|
| | | | | Glucose consumed | Glucose supplied |
| | Ml. | Grams | Grams | Weight percent | Weight percent |
| 0.0 | 97 | 0.62 | 6.30 | 9.8 | 5.5 |
| 3.0 | 1,144 | 7.33 | 10.15 | 72.1 | 63.7 |

EXAMPLE 12

This example illustrates the effect of methanol adjunct in varying amounts upon the production of citric acid from commercial glucose (glucose monohydrate) by *Aspergillus niger*. The initial pH of the media in this example was obtained by the addition of 0.482 N hydrochloric acid. The following base medium was employed, the basis being one liter:

| | | |
|---|---|---|
| Glucose monohydrate | g | 160.0 |
| NH$_4$NO$_3$ | g | 1.750 |
| K$_2$SO$_4$ | g | 0.232 |
| NH$_4$H$_2$PO$_4$ | g | 0.400 |
| MgSO$_4$·7H$_2$O | g | 0.250 |
| ZnSO$_4$·7H$_2$O | g | 0.044 |
| Ferric tartrate | g | 0.005 |
| Corn steep liquor | ml | 0.5 |

Six cultures of 50 ml. each of this medium were placed in 200 ml. Erlenmeyer flasks. Hydrochloric acid was added to 5 in amounts sufficient to obtain the hydrogen ion concentrations indicated in Table XII (a). After fermentation, the following results were obtained.

*Table XII (a)*

| Initial pH value | cc. HCl added | N/10 citric acid per culture | Dry weight of mycelium per culture | Yield based on glucose consumed |
|---|---|---|---|---|
| | | Ml. | Grams | Weight percent |
| 4.00 | 0 | 42 | 1.28 | 6.7 |
| 2.51 | 10 | 34 | 1.23 | |
| 2.10 | 20 | 38 | 1.21 | |
| 1.90 | 30 | 52 | 1.34 | |
| 1.75 | 40 | 58 | 1.35 | 8.0 |
| 1.65 | 50 | 64 | 1.23 | 9.0 |

The initial procedure of this example was repeated, with, however, the addition of one percent methanol by volume to the media just prior to inoculation. The results are summarized in Table XII (b).

*Table XII (b)*

| Initial pH value | cc. HCl added | N/10 citric acid per culture | Dry weight of mycelium per culture | Yield based on glucose consumed |
|---|---|---|---|---|
| | | Ml. | Grams | Weight percent |
| 4.00 | 0 | 258 | 1.18 | 31.2 |
| 2.51 | 10 | 258 | 1.28 | 30.6 |
| 2.10 | 20 | 350 | 1.24 | 40.0 |
| 1.90 | 30 | 392 | 1.24 | 44.1 |
| 1.75 | 40 | 424 | 1.27 | 45.1 |
| 1.65 | 50 | 532 | 1.14 | 63.2 |

The initial procedure of this example was repeated, except that 2 per cent methanol by volume was added to the media just prior to inoculation. The results are summarized in Table XII (c).

*Table XII (c)*

| Initial pH value | cc. HCl added | N/10 citric acid per culture | Dry weight of mycelium per culture | Yield based on glucose consumed |
|---|---|---|---|---|
| | | Ml. | Grams | Weight percent |
| 4.00 | 0 | 476 | 1.12 | 47.5 |
| 2.51 | 10 | 510 | 1.13 | 54.1 |
| 2.10 | 20 | 542 | 1.08 | 57.5 |
| 1.90 | 30 | 508 | 1.09 | 56.2 |
| 1.75 | 40 | 496 | 1.02 | 55.6 |
| 1.65 | 50 | 494 | 0.96 | 56.8 |

The initial procedure of this example was repeated, except that 3 percent methanol by volume was added to the media just prior to inoculation. The results are summarized in Table XII (d).

*Table XII (d)*

| Initial pH value | cc. HCl added | N/10 citric acid per culture | Dry weight of mycelium per culture | Yield based on glucose consumed |
|---|---|---|---|---|
| | | Ml. | Grams | Weight percent |
| 4.00 | 0 | 518 | 1.03 | 56.3 |
| 2.51 | 10 | 454 | 0.87 | 59.9 |
| 2.10 | 20 | 444 | 0.87 | 60.0 |
| 1.90 | 30 | 434 | 0.80 | 59.8 |
| 1.75 | 40 | 418 | 0.72 | 60.2 |
| 1.65 | 50 | 312 | 0.62 | 54.8 |

As previously mentioned, my invention makes possible the use of cruder raw materials in the fermentation media than has heretofore been possible for the satisfactory production of the acids. The high yields of the desired products, characterizing my invention, are not diminished by the presence of trace elements heretofore thought to be deleterious. This is particularly true of the production of citric acid from crude molasses. The molasses vary greatly in trace element content; for example, the manganese content may vary from 5 to 100 parts per million, depending on the source and previous treatment. This element is one well known to interfere in prior fermentation processes for citric acid production. In my process the necessity for purification and removal of manganese from crude molasses is obviated.

Example 11 above illustrates a tolerance for appreciable amounts of manganese. The following examples illustrate the invention employing controlled amounts of manganese, and it may be seen that relatively large amounts of this element can be tolerated without diminution in citric acid production.

Example 13 illustrates the production of citric acid from a sucrose medium containing high concentrations of manganese, supplied as manganese sulfate, employing 3 percent methanol as the adjunct. The effect of all 5 adjuncts over the ranges of 1 to 5 volume percent is similar to the results of these examples. Example 14 illustrates the production of citric acid from beet molasses. The crude molasses were treated with potassium ferrocyanide to remove such trace elements as manganese and iron. Manganese sulfate was then added to the media in the designated amounts.

EXAMPLE 13

Fifty ml. portions of a fermentation medium were prepared. The medium consisted of the following ingredients made up for one liter:

Sucrose _____g__ 160.0
$NH_4NO_3$ _____g__ 1.50
$KH_2PO_4$ _____g__ 0.150
Corn steep liquor _____ml__ 3.0
$ZnSO_4 \cdot 7H_2O$ _____g__ 0.044

The initial pH of the medium was 4.1. Each flask was sterilized and then inoculated with spores of *Aspergillus niger* and then incubated at 30° C. for 8 days. The results are summerized in Table XIII.

*Table XIII*

| Manganese per liter | N/10 citric acid per culture | Dry weght of mycelium per culture | Yield of anhydrous citric based based on sucrose consumed |
|---|---|---|---|
| Mg. | Ml. | Grams | Weight Percent |
| 0 | 690 | 0.96 | 60.3 |
| 55 | 748 | 1.05 | 64.5 |
| 110 | 704 | 1.20 | 62.7 |
| 220 | 706 | 1.22 | 62.9 |
| 330 | 712 | 1.13 | 63.4 |

EXAMPLE 14

Two hundred grams of beet molasses were adjusted to pH 6.0 with HCl and then treated with 0.5 gram of potassium ferrocyanide. The resulting precipitate was removed and 50 ml. portions of the molasses were placed in 200 ml. Erlenmeyer flasks. The flasks were sterilized and inoculated with spores of *Aspergillus niger*. Addition of methanol and manganese (as manganese sulfate) were made as shown in Table XIV. The flasks were incubated at 30° C. for 6 days, and the results are summarized in Table XIV.

*Table XIV*

| Manganese per liter | Methanol | N/10 citric acid per culture | Spore crop | Gluconic acid present |
|---|---|---|---|---|
| Mg. | Volume Percent | Ml. | | |
| 0 | 0 | 402 | None | Fair |
| 0 | 0 | 545 | None | Trace |
| 10 | 0 | 209 | Heavy | Good |
| 10 | 2 | 455 | None | Trace |

In this example the addition of manganese in the absence of methanol caused heavy sporulation and pronounced decrease in acid production. Moreover, the addition of the adjunct increased the production of citric acid and reduced the amount of gluconic acid formed.

Examples 15 and 16 which follow illustrate my invention employing blackstrap molasses as the carbon source. Example 15 illustrates my process using submerged methods, while Example 16 illustrates a surface method.

EXAMPLE 15

This example illustrates the effect of methanol and ammonium chloride on the production of citric acid from blackstrap molasses by *Aspergillus niger* in submerged culture.

The medium consisted of 288 grams of blackstrap molasses containing 150 grams of invert sugar and 0.044 gram of zinc sulfate per liter. The molasses had an initial pH of 5.4. Each culture consisted of 100 ml. of this medium, inoculated with 2 ml. of a germinated spore suspension in 300 ml. Erlenmeyer flasks. The flasks were incubated at 28° C. on a Gump shaking machine at 200 R. P. M. for 10 days. The methanol was added just before inoculation.

In a comparative experiment only traces of citric acid were formed without the alcohol additive.

*Table XV*

| Methanol added percent | NH₄Cl per L. | N/10 acid per culture | Dry weight of mycelium | Weight yield of acid on sugar consumed | Ca oxalate precipitate with CaCl₂ |
|---|---|---|---|---|---|
| | *g.* | *ml.* | *g.* | *Percent* | |
| 2.5 | 0 | 924 | 2.4 | 57 | medium. |
| 3.0 | 0 | 1196 | 2.1 | 69 | Do. |
| 2.5 | .67 | 940 | 2.5 | 52 | trace. |
| 3.0 | .67 | 1212 | 2.3 | 62 | none. |

EXAMPLE 16

This example illustrates the effect of methanol on the production of citric acid from blackstrap molasses by *Aspergillus niger* in surface culture. The cultures consisted of 50 milliliters of nutrient solution in 200 ml. Erlenmeyer flasks inoculated with dry ungerminated spores. The only nutrient material was 238 grams of blackstrap molasses (150 grams of invert sugar) per liter. The germination was allowed to proceed for 8 days with the results tabulated below.

*Table XVI*

| | Percent methanol added at start | | | | |
|---|---|---|---|---|---|
| | 0 | 1.5 | 2.0 | 2.5 | 3.0 |
| N/10 acid per culture, ml. | 176 | 460 | 620 | 706 | 698 |
| Dry weight of mycelium per culture, g. | 1.10 | 1.06 | 1.14 | 1.09 | 1.11 |
| Weight yield of citric acid based on sugar consumed, percent | 28 | 59 | 64 | 70 | 72 |
| Spores on mycelium | Heavy | Trace | Trace | None | None |

I claim:
1. A method for increasing the yield of an organic acid of the group consisting of citric acid, itaconic acid, and ethylene oxide dicarboxylic acid by mold fermentation of fermentable carbon sources comprising carrying out the fermentation in the presence of 1 to 5 percent by volume of one of the group consisting of low molecular weight monohydric alkanols and methyl acetate.

2. Process of claim 1 carried out under submerged-aerated conditions.

3. Process of claim 1 carried out by surface cultivation.

4. The method of claim 1 in which the fermentation medium contains corn steep liquor and is carried out under submerged-aerated conditions.

5. Method for the production of an organic acid of the group consisting of citric acid, itaconic acid, and ethylene oxide dicarboxylic acid by mold fermentation which comprises cultivating a mold known to produce the acid in a medium containing a fermentable carbon source and 1 to 5 volume percent of an adjunct of the group consisting of methanol, ethanol, normal propanol, isopropanol and methyl acetate.

6. A method for the production of citric acid by mold fermentation which comprises cultivating a citric acid producing mold in a medium containing a fermentable carbon source and 1 to 5 volume percent of an adjunct of the group consisting of methanol, ethanol, normal propanol, isopropanol and methyl acetate.

7. Method of claim 6 in which the fermentation is carried out within the range of pH 1.5 to pH 8.5 and the fermentable carbon source is glucose.

8. Method of claim 6 in which the fermentation is carried out within the range of pH 1.5 to pH 8.5 and the fermentable carbon source comprises sucrose.

9. Method of claim 6 in which the fermentation is carried out within the range of pH 1.5 to pH 8.5 and the fermentable carbon source is molasses.

10. Method of claim 6 in which the fermentation is carried out within the range of pH 1.5 to pH 8.5 and the fermentable carbon source is blackstrap molasses.

11. Method of claim 6 in which the fermentation is carried out within the range of pH 1.5 to pH 8.5 and the fermentable carbon source comprises starch.

12. Method of claim 6 in which the fermentation is carried out within the range of pH 1.5 to pH 8.5 and the fermentable carbon source is ground corn.

13. Process according to claim 6 carried out under submerged-aerated conditions.

14. Process of claim 6 carried out by surface cultivation.

15. The method of claim 6 in which the mold is taken from the group consisting of *Aspergillus niger*, *Aspergillus wentii*, *Aspergillus schiemanni*, and *Penicillium implicatum*.

16. Method for the production of itaconic acid which comprises cultivating *Aspergillus terreus* in a medium containing a fermentable carbon source and 1 to 5 volume percent of an adjunct of the group consisting of methanol, ethanol, normal propanol, isopropanol and methyl acetate.

17. Method of claim 12 in which the fermentation is carried out within the range of pH 1.5 to pH 8.5, the fermentable carbon source is glucose and the adjunct is methanol.

18. Method for the production of ethylene oxide dicarboxylic acid which comprises cultivating *Aspergillus fumigatus* in a medium containing a fermentable carbon source and 1 to 5 volume percent of an adjunct of the group consisting of methanol, ethanol, normal propanol, isopropanol and methyl acetate.

19. Method of claim 17 in which the fermentation is carried out within the range of pH 1.5 to pH 8.5, the fermentable carbon source comprises glucose and the adjunct is an alkanol.

20. Method for the production of citric acid by mold fermentation which comprises cultivating a citric acid producing mold in a medium containing a fermentable carbon source, appreciable amounts of manganese, and 1 to 5 volume percent of an adjunct of the group consisting of low molecular weight monohydric alkanol and methyl acetate.

21. The method of claim 20 in which the medium contains 5 to 100 parts per million of manganese.

22. The method of claim 20 in which the adjunct is methanol.

References Cited in the file of this patent

UNITED STATES PATENTS

| Number | Name | Date |
|---|---|---|
| 2,006,086 | May | June 25, 1935 |
| 2,416,821 | Coulthard | Mar. 4, 1947 |
| 2,438,136 | Szucs | Mar. 23, 1948 |
| 2,462,981 | Lockwood | Mar. 1, 1949 |

OTHER REFERENCES

Foster, Chemical Activities of Fungi, 1949, Academic Press Inc., Pub., New York, New York, pages 400–7.